A. M. SCHLAGEL.
TRACTOR.
APPLICATION FILED MAY 9, 1921.
1,416,127.
Patented May 16, 1922.
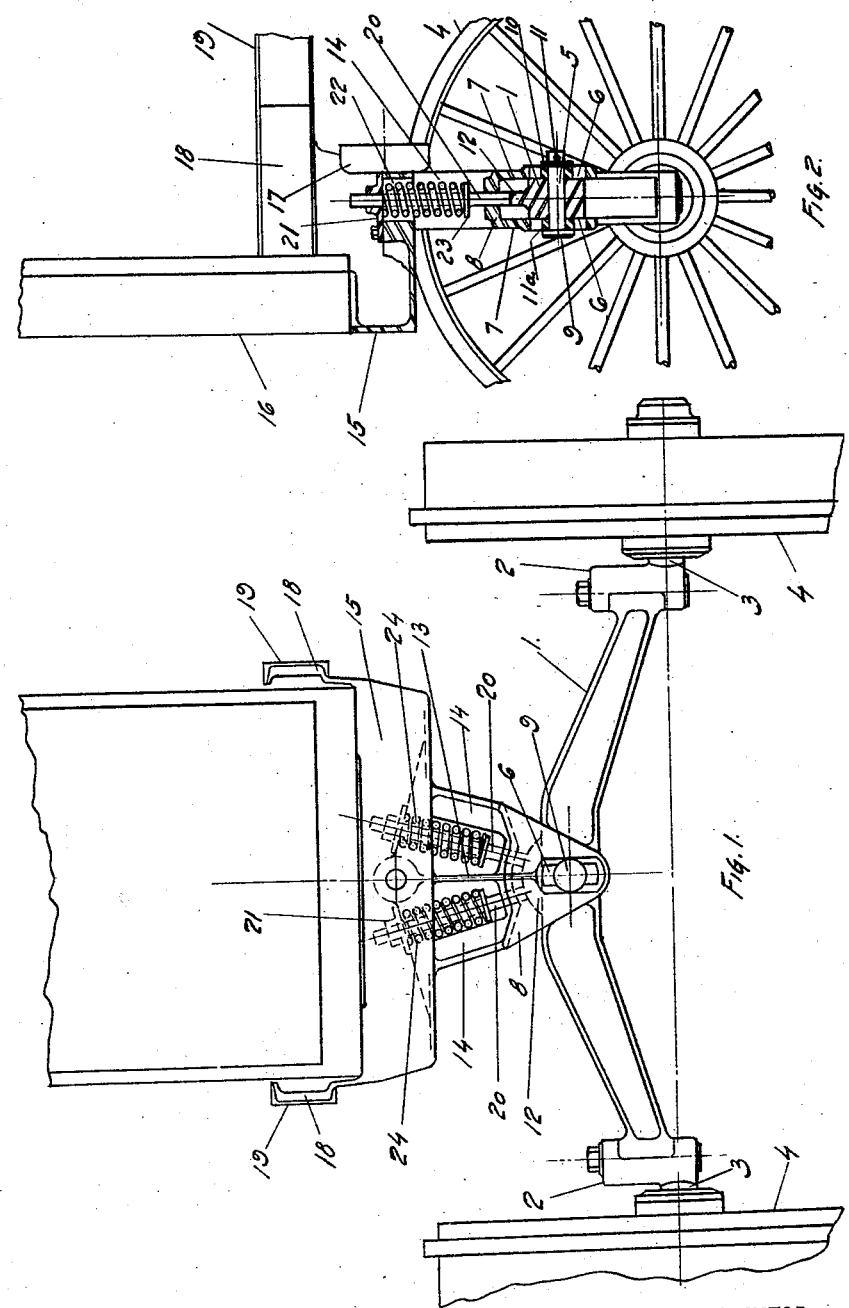

UNITED STATES PATENT OFFICE.

ALFRED M. SCHLAGEL, OF MONTGOMERY COUNTY, NEAR DAYTON, OHIO, ASSIGNOR TO RIAL T. PARRISH, OF DAYTON, OHIO.

TRACTOR.

1,416,127.  Specification of Letters Patent.  Patented May 16, 1922.

Application filed May 9, 1921. Serial No. 467,889.

*To all whom it may concern:*

Be it known that I, ALFRED M. SCHLAGEL, a citizen of the United States, residing in the county of Montgomery, near the city of Dayton, State of Ohio, have invented certain new and useful Improvements in Tractors, of which the following is a specification.

The principal object of my invention is to provide simple and efficient means for cushioning the front end of a tractor so that the radiator, engine and other parts carried by the front end of the machine will not be subjected to violent vibrations.

Other important and incidental objects will be brought out in the following specification and particularly set forth in the subjoined claims.

In the accompanying drawings, Figure 1 is a front view of a tractor equipped with my improved cushioning means. And Figure 2 is a side view thereof, partly in section, showing said cushioning means.

Throughout the specification and drawings, similar reference characters denote corresponding parts.

Referring to the accompanying drawings for a detailed description of the preferred form of embodiment of my invention, the numeral 1 designates a preferably drop-forged front axle, to each end of which there is pivotally secured a steering knuckle 2. On the spindles 3 of said knuckles are mounted the front tractor wheels 4. (See Figure 1.)

Projecting through a hole in the middle portion of the axle 1, is a bolt 5. The ends of the latter project through slots 6, 6 provided in the fork ends 7, 7 respectively of a front end supporting bracket 8 that is preferably a steel casting. The forked end of this bracket straddles the axle 1 for a vertical movement in respect to it, being guided in such movement by the bolt 5, which has a wide head 9 on its front end, and which has secured to its rear end a washer 10 that is held in place by a cotter pin 11. (See Figure 2). Surrounding each portion of the bolt 5 that lies within a slot 6 in the forked end of the bracket 8, is a block 11ª that has a free vertical movement within its respective slot to prevent a lateral movement of the bracket on the axle.

Formed on the top middle portion of the axle 1 is a segmental projection 12 whose center coincides with the axis of the bolt 5. Projecting upwardly from the forked portion of the bracket 8 is a central rib 13 and two outer ribs 14, 14 that are preferably T shaped in cross section. At their upper ends these ribs are integral with, and support, a box like member 15 upon which rests the radiator 16 and in whose rear end there is provided a cup-shaped recess 17 to receive the front end of the engine (not shown). Projecting upwardly from the sides of the supporting member 15, are arms 18, 18 formed to receive the front ends of the side channel members 19, 19 respectively of the tractor.

Located radially in the spaces between the central rib 13 and the two outer ribs 14, 14, are two plungers 20, 20 whose lower ends project through holes in the top of the forked portion of the bracket 8, for support by the segmental projection 12 of the axle 1. The upper end of each plunger 20 projects loosely through a hole in a cover plate 21 that is secured over a cored recessed portion 22 in the bottom of the hollow supporting member 15. There is formed on each plunger 20 near its lower end, a flange 23. Between the latter and the cover plate 21 above it, a coil spring 24 encircles the plunger.

Now when the front wheels 4, 4 encounter an obstruction or a depression in the road or field, the shock will be transmitted in equal proportions to the springs 24, 24 through the plungers 20, 20 that rest upon the segmental projection 12 of the axle 1, irrespective of the position of the horizontal axis of each wheel to the vertical center line of the tractor. Since the center of the segmental projection 12 and the center of the bolt 5 coincide, the elevation of one wheel above the other will still compress both springs 24, 24 equally, because in such a case the lower ends of the plungers 20, 20 will be free to move on the periphery of the segmental projection 12 to a position to compensate for the angular inclination of the axle.

I do not wish to be limited to the details of construction and arrangement herein shown and described, and any changes or modifications may be made therein within the scope of the subjoined claims.

Having described my invention, I claim:

1. In a device of the type described, the combination with an axle, of a supporting bracket vertically movable in proximity to the middle portion of said axle, a segmental projection on the top middle portion of said axle, and resilient means resting upon the periphery of said segmental projection and movable laterally over it, to support said bracket.

2. In a device of the type described, the combination with an axle, of a supporting bracket vertically movable in proximity to the middle portion of said axle, a segmental projection on the top middle portion of said axle, a pair of radially-disposed plungers vertically movable within said bracket, whose lower ends rest upon the periphery of said segmental projection, a flange on each plunger, and a coil spring surrounding each plunger in an opening in said bracket, between the top of said opening and the flange on the plunger, for the purpose specified.

3. In a device of the type described, the combination with an axle, of a supporting bracket, a forked lower end on the latter straddling said axle, a bolt passing transversely through the middle portion of said axle and a vertical slot in each fork end of said bracket, a segmental projection on the top middle portion of said axle, a middle and two outer ribs projecting upwardly from the forked end of said bracket, a horizontal supporting member mounted on the top portions of said ribs, a radially-disposed plunger projecting downwardly from a hole in the horizontal supporting member, through a hole in the top of the forked portion of said bracket, for support by the periphery of the segmental projection on the axle, one of said plungers passing through the space between the middle rib and one outside rib, and the other plunger passing through the space between said middle rib and the other outside rib, a flange on each plunger, and a coil spring surrounding each plunger in its respective space between the middle rib and an outside rib of the bracket, and extending from said flange to the top of said space, for the purpose specified.

In testimony whereof I have hereunto set my hand this 6th day of May, 1921.

ALFRED M. SCHLAGEL.

Witness:
HOWARD S. SMITH.